E. KNAUSS.
SHOCK ABSORBER FOR MOTOR VEHICLES.
APPLICATION FILED JUNE 22, 1915. RENEWED JUNE 9, 1916.
1,212,506.
Patented Jan. 16, 1917.
2 SHEETS—SHEET 1.
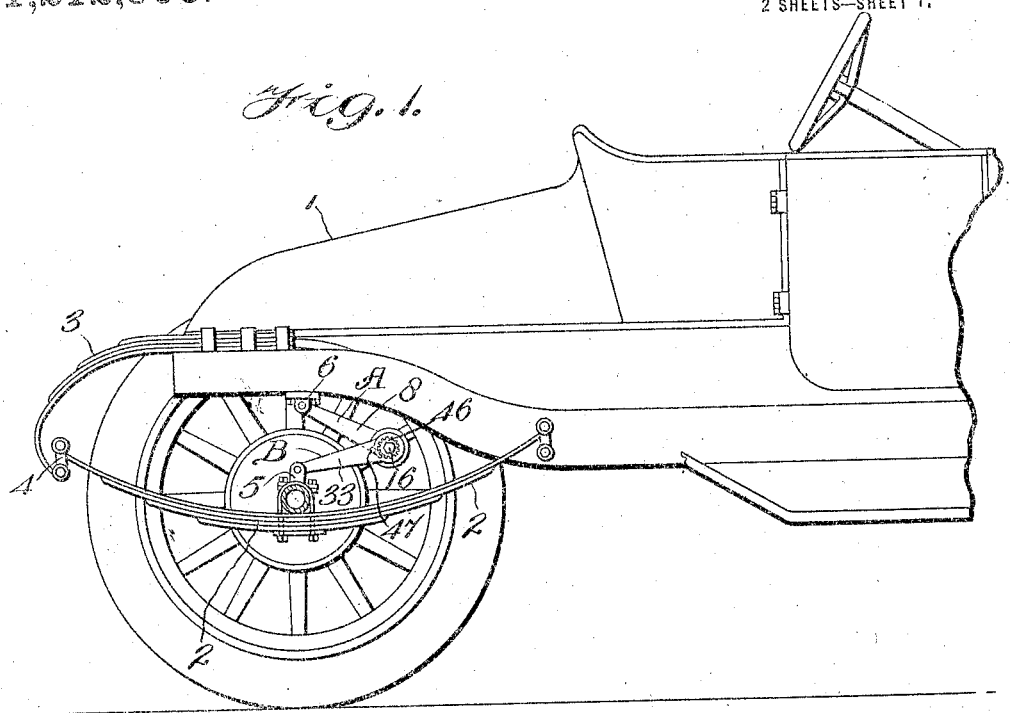
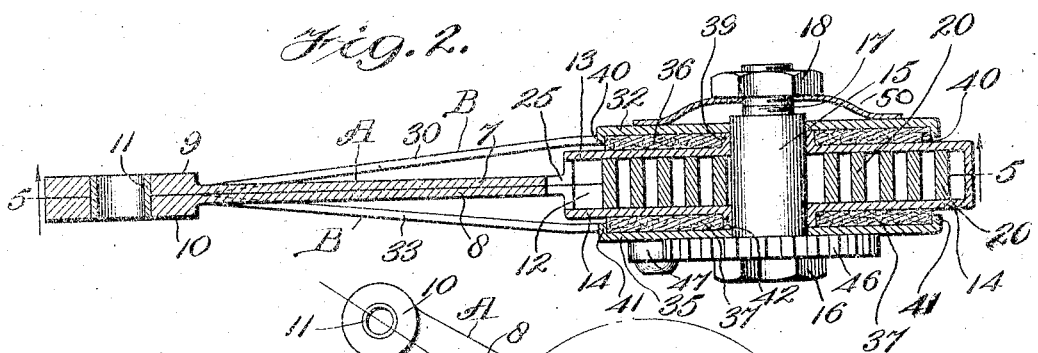
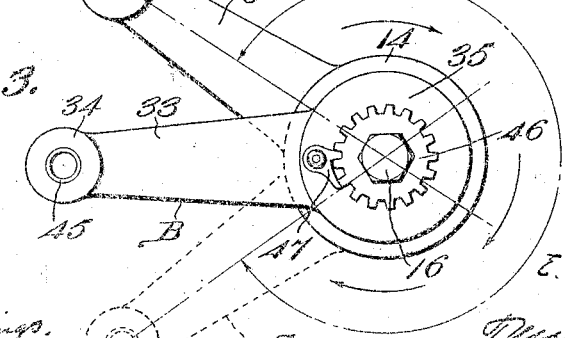

E. KNAUSS.
SHOCK ABSORBER FOR MOTOR VEHICLES.
APPLICATION FILED JUNE 22, 1915. RENEWED JUNE 9, 1916.
1,212,506.
Patented Jan. 16, 1917.
2 SHEETS—SHEET 2.
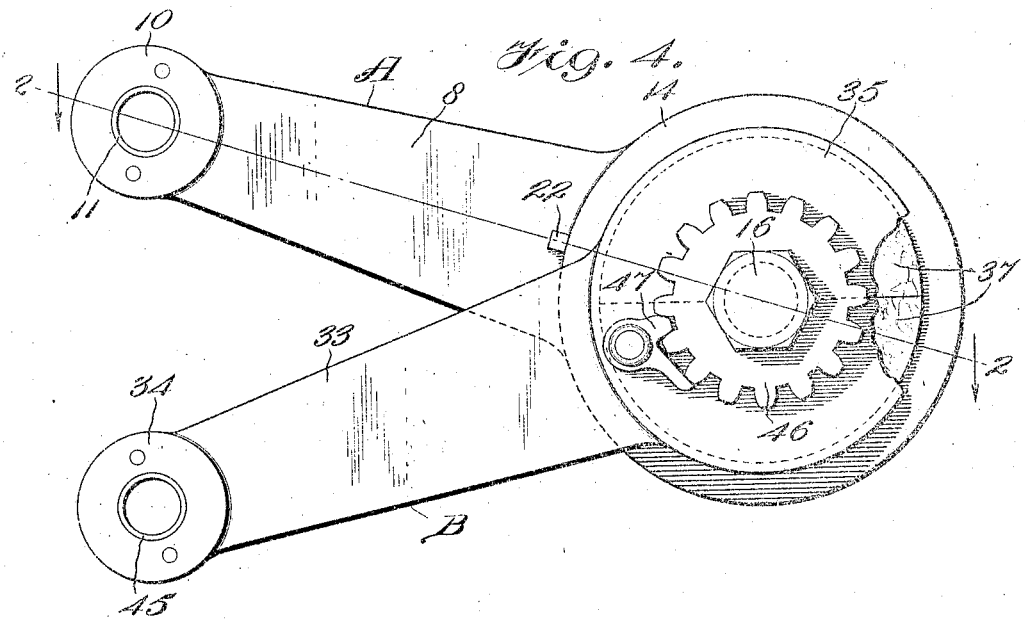
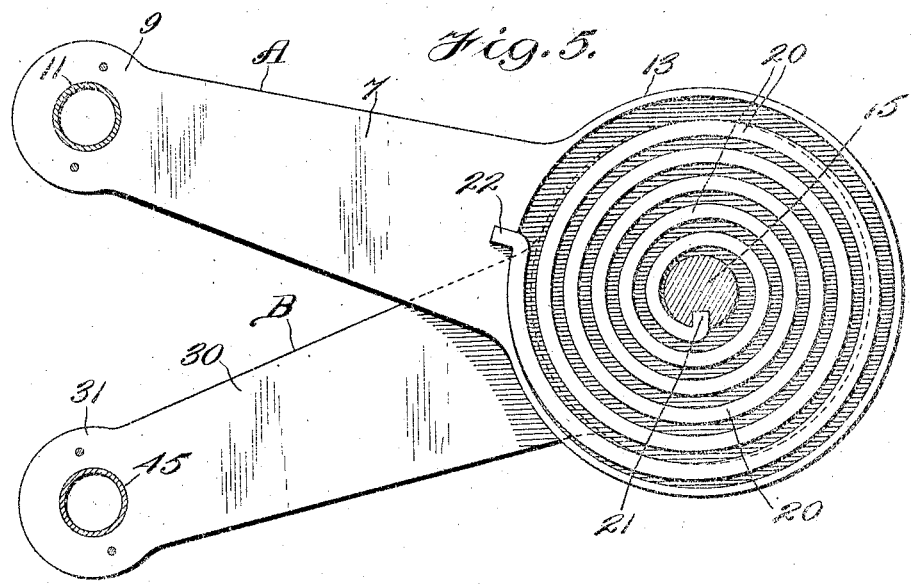
Witness
Byron B. Collings.
Inventor
E. Knauss
by
Attorney

UNITED STATES PATENT OFFICE.

EDWARD KNAUSS, OF MOUNT VERNON, NEW YORK, ASSIGNOR, BY DIRECT AND MESNE ASSIGNMENTS, TO THE K. P. MANUFACTURING COMPANY, INC., OF NEW YORK, N. Y., A CORPORATION OF NEW YORK.

SHOCK-ABSORBER FOR MOTOR-VEHICLES.

1,212,506.     Specification of Letters Patent.     Patented Jan. 16, 1917.

Application filed June 22, 1915, Serial No. 35,569. Renewed June 9, 1916. Serial No. 102,792.

*To all whom it may concern:*

Be it known that I, EDWARD KNAUSS, a citizen of the United States, residing at Mount Vernon, in the county of Westchester and State of New York, have invented certain new and useful Improvements in Shock-Absorbers for Motor-Vehicles; and I do hereby declare the following to be a full, clear, and exact description of the invention, such as will enable others skilled in the art to which it appertains to make and use the same.

This invention relates to shock-absorbers especially adapted for use on motor vehicles, and has for its object to provide an absorber that will be simple in construction, comparatively inexpensive to manufacture, and more efficient in action than those heretofore proposed.

With these and other objects in view the invention consists in the novel details of construction, and combinations of parts more fully hereinafter disclosed and particularly pointed out in the claims.

Referring to the accompanying drawings forming a part of this specification, in which like numerals designate like parts in all the views:—Figure 1 is a diagrammatic view of a portion of an automobile with this invention applied thereto; Fig. 2 is a sectional view of the invention taken on line 2—2 of Fig. 4; Fig. 3 is a diagrammatic plan view illustrating different modes of operation of the absorber; Fig. 4 is a plan view of the absorber certain parts being broken away, to expose one of the friction disks; and Fig. 5 is a view similar to Fig. 4, with a pair of the arms removed to expose the coiled shock absorbing spring.

1 indicates the body of a motor vehicle, 2 the vehicle spring usually carried by the axle, 3 the vehicle spring usually carried by the vehicle body, 4 the usual shackle connecting the springs 2 and 3, 5 any suitable means for attaching one of the absorber arms to the axle, or to spring 2, and 6 any suitable means for attaching another absorber arm to the body 1, or to the spring 3.

The absorber itself comprises a pair of arms 7 and 8, provided on their outer ends with the respective eye members 9 and 10, through which passes the ferrule or sleeve 11. On their inner ends said arms 7 and 8 are oppositely offset to form the box 12, and the respective plate or disk members 13 and 14 provided with central perforations through which passes the pivot bolt 15, having the head 16, the screw threaded end 17 and nut 18. Inside the boxlike space 12, is located the helically coiled absorber spring 20, one end 21 of which is secured to said bolt 15, and the other end 22 of which is secured to said arms 7 and 8, a slot or cutaway portion 25, Fig. 2, being provided in said arms for that purpose.

Outside the arm 7 is a similar arm 30 provided with an eye member 31, and a plate or disk member 32. And outside the arm 8 is located a similar arm 33 provided with an eye member 34, and a plate or disk member 35. The plate or disk members 32 and 35, are offset from their respective arms to form a pair of spaces to accommodate the friction disks 36 and 37 respectively. That is to say, the disk member 32 is located outside of and rests on the thimble like projection or bearing 39 with which the disk member 13 is provided, and between said bearing 39 and the offset flange or rim 40 of the disk 32, is an annular space to accommodate the friction ring or perforated disk 36. In the same way the plate or disk member 35 is provided with an offset rim 41 between which and the offset bearing 42 of the disk 14 rests the friction disk or ring 37.

The arms 7 and 8 are secured together by the sleeve 11 to form a single lever A, and the arms 30 and 33 are likewise secured together by the sleeve 45 to form another independent single lever B. The two single levers thus formed are held at an angle to each other as shown, while the pivot bolt 15 passes through all four of the disk like plates 13, 14, and 32, 35 belonging to said levers as will be clear from the drawings.

Rigid with the bolt 15 is the ratchet wheel 46, and pivotally secured to one of the levers 30 or 33 is the pawl 47 adapted to engage said ratchet 46. 50 represents any suitable spring means adapted to be compressed by the nut 18 to press the disks 13, 14, 32 and 35 together, and thereby increase the friction between said plates and the disks 36 and 37.

The operation of this absorber is as follows: The lever A formed by the members 7 and 8 may be held stationary by the hand, while the pawl 47 is disengaged from its ratchet and the lever B formed by the members 30 and 33 is turned around the pivot bolt 15 until any desired angle separates the two levers A and B. The sleeve 11 on lever A may now be engaged with the fastening means 6 on the vehicle body 1 or vehicle spring 3, and the sleeve 45 on lever B may be likewise engaged with the fastening means 5 carried by the axle or the vehicle spring 2. The pawl 47 is made to engage its ratchet 46, and the nut 18 is set up sufficiently to produce the desired friction between the parts. A wrench may be applied to the head 16 of the bolt 15, and any desired tension may be put into the spring 20.

Let us suppose that the normal tendency of the spring 20 will be to close the levers A and B with a force of say 30 pounds while the friction of the disks 36 and 37 resists this tendency by a force of say 50 pounds. Now, should the wheel run over an obstruction, the axle and spring 2 would be suddenly lifted while the inertia of the body 1 would tend to prevent it from lifting, the result being that the vehicle spring 2 is suddenly strained and that the absorption of this strain is resisted by the absorber friction disks to the extent of 50 pounds while it is assisted by the absorber spring 20 to the extent of 30 pounds. The net result is only a force of say 20 pounds that is taken care of by the absorber, while the rest of the energy is stored up in the vehicle springs. When the wheel strikes the ground again, a moment later, the vehicle springs 2 and 3 fall together and there is a tendency to put them under still greater strains. On the rebound, however, or when the springs 2 and 3 begin to separate to resume their normal positions, the absorber spring 20 opposes this separating motion of the springs 2 and 3 by a force of 30 pounds, and the friction disks oppose it by a force of 50 pounds making a total absorbing force of say 80 pounds, or a force of say four times that which was exerted in the beginning. The result is a highly yielding action of the vehicle springs 2 and 3, while they are absorbing energy, and a very slow rate of giving up the energy absorbed, thus producing unusually smooth riding.

It is not at all necessary that the spring 30 shall normally tend to force the levers A and B toward each other, for the lever B for example, may be held stationary and as indicated in Fig. 3, lever A may be swung in a clockwise direction from its full line position to its dotted line position whereupon if tension is now put upon the spring 20 by turning the head 16 in the same direction as before, the normal tendency of the spring 20 will be to separate the levers A and B instead of to close them. This is an important feature of the invention for it is obvious it enables one to provide any desired adjustment to suit any kind of vehicle springs. For example, suppose one vehicle has such stiff springs that it requires say a 50 pound pull to materially open them. In such case, the absorber may be so set that the arms would pull together with a force of 50 pounds, or in some cases, the vehicle springs might be of such a nature as to require that the arms normally pull together, by a force of say only 10 pounds or 15 pounds. In still other cases the vehicle springs might be so weak that they bumped the axles on rough roads. In such cases, by setting the arms A and B so that they normally tend to pull apart, and by placing sufficient tension on the absorber spring 20, the weakness of the vehicle springs is largely if not entirely overcome. Again instead of winding up the absorber spring when adjusting its tension the absorber spring may be unwound when adjusting the same, if one reverses the pawl 47, and then the absorber will function as one having a weaker or softer spring than was the case before.

It will be clear in all cases that the primary function of the friction employed, is to off-set, or counterbalance, the action of the spring in one direction, and to add to, or work with, said spring action in the other direction.

It is obvious that those skilled in the art may vary the details of construction, as well as the arrangement of parts without departing from the spirit of the invention, and therefore I do not wish to be limited to the above disclosure except as may be required by the claims.

What I claim is:—

1. In a shock absorber, the combination of a pair of relatively movable arms, each arm comprising two members; means for pivoting said arms at an angle to each other; a spring located between the members of one arm adapted to resist a relative movement of said arms in one direction, and to assist said movement in an opposite direction; and friction generating means located between said last named members and each of the members of said other arm adapted to resist said movement in both directions, substantially as described.

2. In a shock absorber the combination of a pair of lever arms; a pivot member joining said arms; a spring one end of which is connected to one of said arms, and the other end of which is connected to said pivot member; a movable connection between the other of said arms and said pivot member; and friction means associated with said arms adapted to resist relative motion thereof, substantially as described.

3. In a shock absorber the combination of a pair of relatively movable arms, each arm comprising two members; means for pivoting said arms at an angle to each other;

a spring located between the members of one arm adapted to resist a relative movement of said arms in one direction and to assist said movement in an opposite direction; friction generating means located between said last named members and each of the members of said other arm adapted to resist said movement in both directions; means to adjust the tension of said spring; and means to adjust said friction generating means; substantially as described.

4. In a shock absorber the combination of a pair of relatively movable arms; a spring controlling the movement of said arms; a friction generating means for controlling the movement of said arms, and of said spring in one direction; means to adjust the tension of said spring; and means comprising a spring member for adjusting the pressure of said friction generating means, substantially as described.

5. In a shock absorber the combination of a pair of relatively movable arms; a spring controlling the movement of said arms; a pivot member holding said arms and spring together; one end of said spring being attached to one of said arms and the other end to said pivot member; a friction generating means for controlling the movement of said arms and of said spring in one direction; means comprising a pawl carried by the other of said arms and a ratchet carried by said pivot member to adjust the tension of said spring; and means comprising a spring member for adjusting the pressure of said friction generating means, substantially as described.

In testimony whereof I affix my signature, in presence of two witnesses.

EDWARD KNAUSS.

Witnesses:
   H. C. STINNER,
   J. T. SUNDERLAND.